United States Patent
Brevick et al.

(10) Patent No.: US 9,976,625 B2
(45) Date of Patent: May 22, 2018

(54) PENDULUM CRANK CYCLOID INSERT FOR PENDULUM CRANKSHAFT HAVING INTEGRAL CARRIER

(71) Applicant: Ford Global Technologies, LLC, Dearborn, MI (US)

(72) Inventors: John Edward Brevick, Livonia, MI (US); Wayne Paul Woodside, Ypsilanti, MI (US); Jeffrey Eliot Chottiner, Farmington Hills, MI (US); Rick L. Williams, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 626 days.

(21) Appl. No.: 14/170,840

(22) Filed: Feb. 3, 2014

(65) Prior Publication Data

US 2015/0219184 A1    Aug. 6, 2015

(51) Int. Cl.
*F16F 15/14*    (2006.01)
*F16C 3/06*    (2006.01)
(Continued)

(52) U.S. Cl.
CPC ............... *F16F 15/14* (2013.01); *F16C 3/06* (2013.01); *F16C 3/20* (2013.01); *F16F 15/1457* (2013.01); *F16C 3/12* (2013.01); *Y10T 74/2184* (2015.01)

(58) Field of Classification Search
CPC ............. Y10T 74/2128; Y10T 74/2183; Y10T 74/2184; F16F 15/14; F16F 15/145;
(Continued)

(56) References Cited

U.S. PATENT DOCUMENTS 1,803,317 A * 5/1931 Brown .................. F16F 15/283
                                              411/998
2,387,776 A * 10/1945 Salomon ............... F16F 15/145
                                              74/574.2
(Continued)

FOREIGN PATENT DOCUMENTS

DE            1111877 B  *  7/1961  ............ F16F 15/283

OTHER PUBLICATIONS

Machine translation of DE 1111877, dated May 25, 2016.*

*Primary Examiner* — Richard W Ridley
*Assistant Examiner* — Brian J McGovern
(74) *Attorney, Agent, or Firm* — LeClairRyan

(57) ABSTRACT

A pendulum crankshaft for an internal combustion engine includes a pendulum crankshaft having pendulum crank cycloid inserts. The inserts may be formed from high graded hardened steel while the crankshaft may be formed from conventional iron. The pendulum crankshaft includes a crankshaft having pendulum-holding ears. A cycloid insert-receiving aperture is formed in each of said ears for receiving a cycloid insert. Each of the cycloid inserts has a cycloid path formed therethrough. The pendulum is movably attached to the ears by a rolling pin fitted through the cycloid paths of the ears and captured between the cycloid paths formed in each half of the pendulum. Each half of the pendulum includes recessed areas on which the cycloid paths are formed. A pin is provided between each cycloid insert and the ear into which it is inserted to restrict rotation of the cycloid insert with respect to the ear.

7 Claims, 9 Drawing Sheets

(51) Int. Cl.
*F16C 3/20* (2006.01)
*F16C 3/12* (2006.01)

(58) Field of Classification Search
CPC ...... F16F 15/1457; F16F 15/28; F16F 15/283;
F16F 15/286; F16F 15/20; F16F 15/22;
F16F 15/26; F16F 15/10; F16F 15/1407;
F16F 2230/0011; F16C 3/20
See application file for complete search history.

(56) References Cited

U.S. PATENT DOCUMENTS

| | | | | |
|---|---|---|---|---|
| 2,496,836 | A | * | 2/1950 | Williams ................ F16F 15/14 74/604 |
| 2,584,384 | A | * | 2/1952 | Galliers .............. F16F 15/1457 74/604 |
| 2,592,114 | A | * | 4/1952 | Bynum ................. F16F 15/14 74/604 |
| 3,559,504 | A | * | 2/1971 | Deutschmann ....... F16F 15/283 74/603 |
| 5,207,120 | A | | 5/1993 | Arnold et al. |
| 5,983,752 | A | * | 11/1999 | Wahlstrom ............ B28B 1/0873 74/571.1 |
| 6,026,776 | A | | 2/2000 | Winberg |
| 6,688,272 | B2 | | 2/2004 | Brevick |
| 7,284,528 | B2 | | 10/2007 | Natkin et al. |
| 9,068,617 | B2 | * | 6/2015 | Pietron ................ F16F 7/1005 |
| 2012/0304808 | A1 | | 12/2012 | Amano et al. |
| 2013/0014609 | A1 | | 1/2013 | Tsukano et al. |
| 2013/0098198 | A1 | | 4/2013 | Geist et al. |

\* cited by examiner

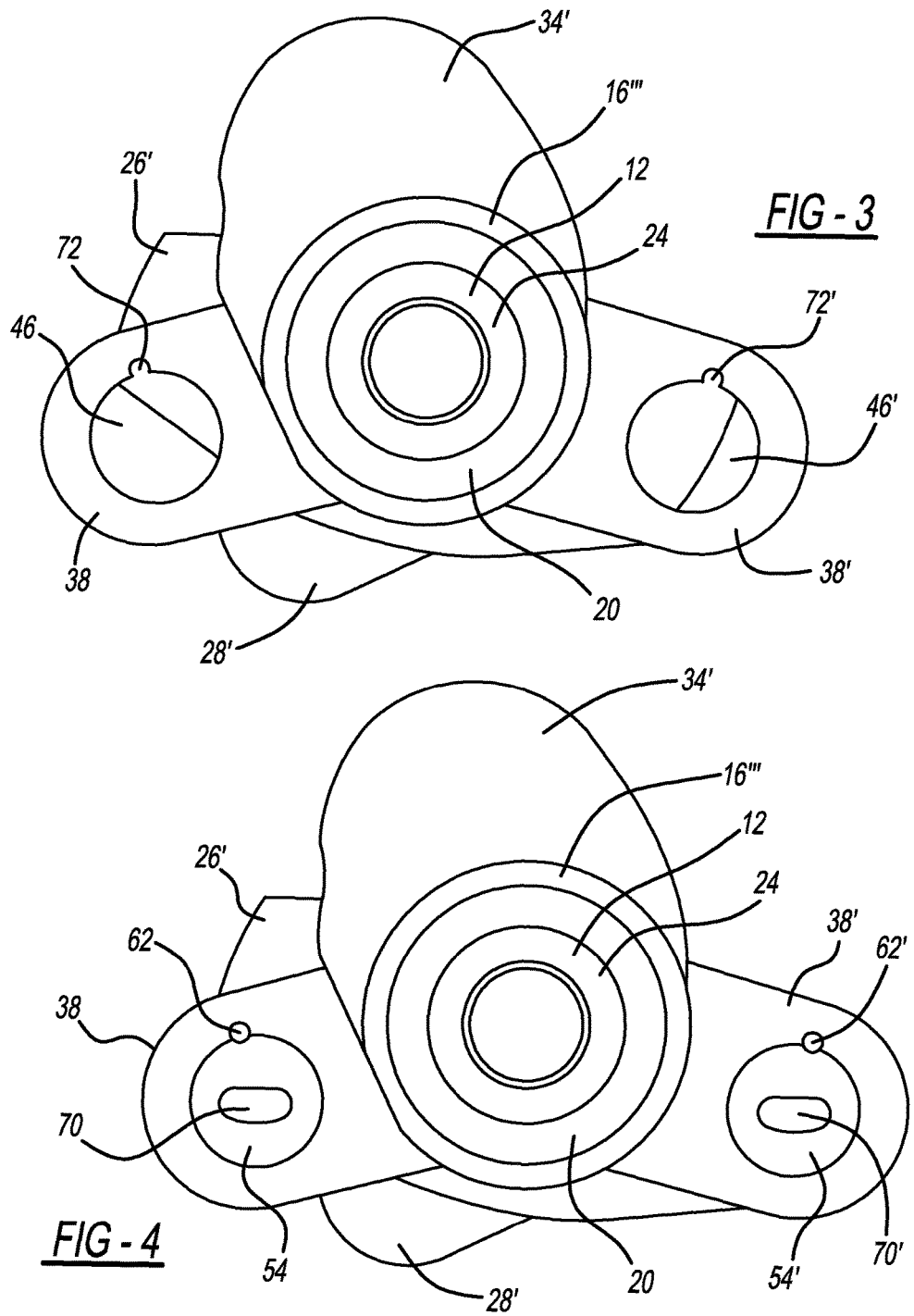

PENDULUM CRANK CYCLOID INSERT FOR PENDULUM CRANKSHAFT HAVING INTEGRAL CARRIER

TECHNICAL FIELD

The disclosed inventive concept relates generally to pendulum crankshafts for internal combustion engines. More particularly, the disclosed inventive concept relates to pendulum crank cycloid inserts for a pendulum crankshaft having an integral carrier.

BACKGROUND OF THE INVENTION

Internal combustion engines having a relatively small number of cylinders provide automobile makers with an attractive solution to the need for improved fuel economy. In order to compensate for reduction of cubic capacity, vehicle manufacturers developed technologies to improve engine power, such as direct fuel injection, turbocharging, and variable timing for inlet and exhaust camshafts. In this way six- and eight-cylinder engines can be scaled down without losing available horsepower.

An undesirable consequence of engines with a small number of cylinders is high crankshaft torsional vibration and high engine block vibration caused by forces, such as first and second order forces, that are not cancelled. Such vibrations are ultimately transmitted through the engine mounts and to the vehicle structure.

Engineers managed these vibrations to one extent or another through a variety of approaches, many of which increase the cost of construction and reduce fuel economy. One accepted solution to overcome excessive vibration is the provision of one or more pendulums on the crankshaft to lower the torsional vibration of the crankshaft and the consequent block vibration. Such crankshaft-mounted pendulums function as vibration absorbers as they are tuned to address and thus cancel out vibrations generated by crankshaft rotation, thus smoothing torque output of the crankshafts. This approach is taken as well by designers of some airplane piston engines where the pendulums smooth output torque and reduce stress within the crankshaft itself.

An example of a pendulum vibration absorber associated with an engine crankshaft is set forth in U.S. Pat. No. 4,739,679, assigned to the assignee of the instant application. According to the arrangement set forth in this patent, a pendulum includes an inner curved cam follower surface that is alternately engaged and disengaged from a pin type cam fixed on the pendulum carrier. The crankshaft pendulum is interconnected with the pendulum carrier by pairs of rollers that are movable on mating curved tracks. While there are a number of variations of the movable relationship between the pendulum and the cycloid surface of the crankshaft it is common to incorporate rolling pins as the points of contact between these two components.

While providing an effective solution to the problem of vibrations in smaller internal combustion engines the pendulum crankshaft requires high strength hardened steel on which the rollers can roll. To satisfy this requirement the entire crankshaft must be formed from high grade steel to meet the hardness requirements for the cycloid surfaces. Attempts to harden only the surface of the cycloid sometimes result in distortion of the crankshaft. Beyond the prohibitions created by material costs for an all-hardened steel crankshaft, the labor and tooling required to machine a cycloid into the crankshaft is also expensive.

Thus a new approach to the pendulum crankshafts is needed to address the problems associated with known arrangements.

SUMMARY OF THE INVENTION

The disclosed inventive concept overcomes the problems associated with known pendulum crankshafts for internal combustion engines by providing a pendulum crankshaft having pendulum crank cycloid inserts, thus requiring only the cycloid inserts to be formed from high graded hardened steel. The crankshaft itself may be formed from conventional iron.

The pendulum crankshaft for an internal combustion engine of the disclosed inventive concept includes a crankshaft having pendulum-holding ears. A cycloid insert-receiving aperture is formed in each of said ears for receiving a cycloid insert. Each of the cycloid inserts has a cycloid path formed therethrough. The pendulum is movably attached to the ears by a rolling pin fitted through the cycloid paths of the ears and captured between the cycloid paths formed in each half of the pendulum.

Each half of the pendulum includes recessed areas. The cycloid paths are formed on the recessed areas. A pin is provided between each cycloid insert and the ear into which it is inserted to restrict rotation of the cycloid insert with respect to the ear.

For base line testing purposes, it may be necessary to temporarily fix the pendulum relative to the crankshaft in what would likely be a non-production engine. To this end and for this purpose, a locking pin passing aperture is formed in each pendulum. The crankshaft includes a locking pin receiving aperture. A removable locking pin passes through said locking pin passing aperture and into the locking pin receiving aperture for locking movement of the pendulum with respect to the crankshaft. The locking pin deactivates the pendulum for base line testing. Under normal operations the locking pin is removed and is replaced with a balance pin. The locking pin and its associated components would be removed for operation in the non-production engine.

According to the disclosed inventive concept and as noted above, the crankshaft can be formed from conventional iron while the cycloid inserts themselves are formed from a high graded hardened steel then attached to the crankshaft. The cycloid inserts can be machined from a long, hardened bar with wire EDM and then sliced to the correct width.

As a variation of the disclosed inventive concept, the path of the insert is not limited to the cycloid path described above. Alternative path configurations could include, for example, epicycloid and circular.

As a further variation of the disclosed inventive concept, while the hardened inserts are described above as being inserted into the crankshaft it may also be possible to instead fit the hardened inserts to the pendulum. In addition, it is conceivable that a combination of inserts fitted to both the crankshaft and to one or more pendulums in the same engine is possible.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 3 shows an end view of a pendulum crankshaft shown in FIG. 2;

FIG. 4 is the same view as FIG. 3 but illustrates the pendulum crankshaft having cycloid inserts;

DETAILED DESCRIPTION OF THE PREFERRED EMBODIMENT

Figure 1:
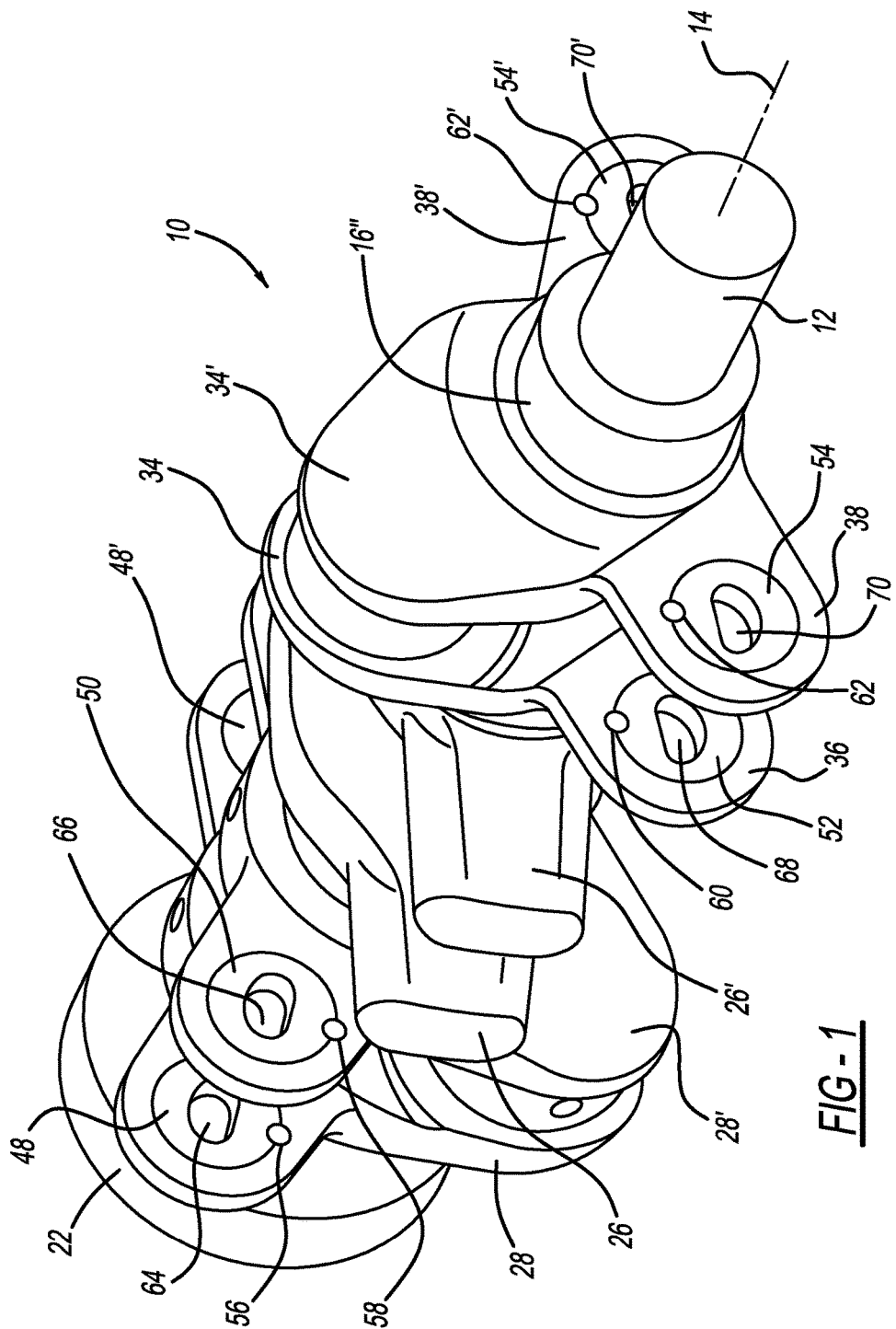
FIG. 1 is a perspective view of a crankshaft having cycloid inserts according to the disclosed inventive concept.

In the following figures, the same reference numerals will be used to refer to the same components. In the following description, various operating parameters and components are described for different constructed embodiments. These specific parameters and components are included as examples and are not meant to be limiting.

Figure 2:
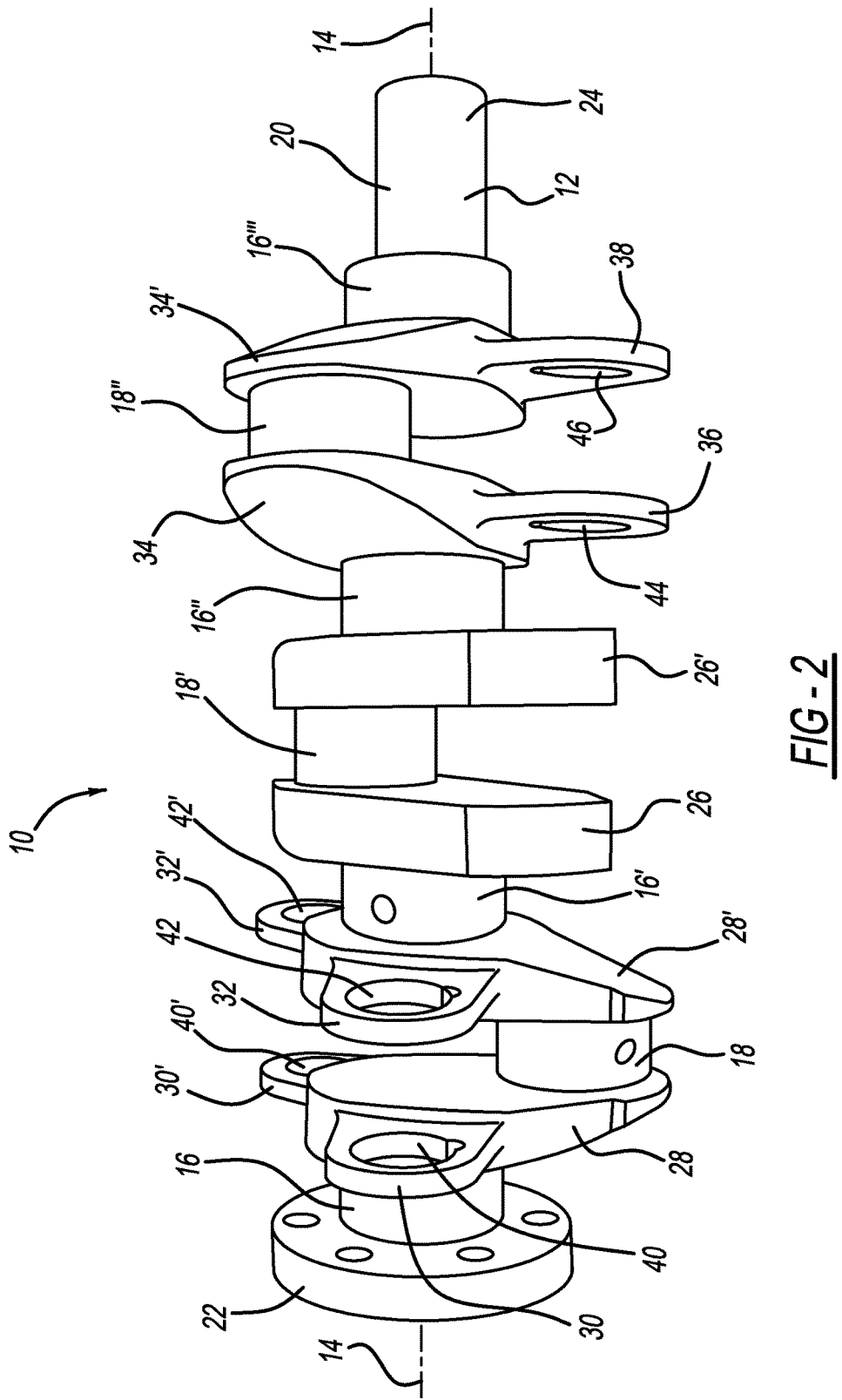
FIG. 2 is a side view of the crankshaft of FIG. 1 but illustrated without either the cycloid inserts or pendulums of the disclosed inventive concept.

Referring to FIGS. 1 and 2, a crankshaft assembly for an internal combustion engine is illustrated. FIG. 3 illustrates an end view of the pendulum crankshaft shown in FIG. 2 without the cycloid inserts while FIG. 4 illustrates the same view as FIG. 3 but with the cycloid inserts. It is to be understood that the overall configuration of the illustrated crankshaft assembly, generally illustrated as 10 in FIGS. 1 and 2, is set forth for suggestive purposes only as the overall configuration may be altered from that illustrated.

The crankshaft assembly 10 includes a crankshaft 12. The crankshaft 12 has a rotational axis 14. Rotation of the crankshaft 12 about its rotational axis 14 is made possible by the provision of main journals 16, 16', 16" and 16'". The journals 16, 16', 16" and 16'" are integrally formed as part of the crankshaft 10 and are restrained within the engine block (not shown) by crankshaft bearings (not shown).

The connecting rods (not shown) are attached as is known in the art to rod journals 18, 18' and 18" by rod bearings. The rod journals 18, 18' and 18" are integrally formed on the crankshaft 12, again as is known in the art.

The crankshaft 12 includes a first end 20 and a second end 22. Conventionally provided extending from one end, in this case the first end 20, is a snout 24. The snout 24 serves as a mount for any number of engine components, such as a damper, a fan belt pulley and a drive mechanism for a camshaft. None of these components is shown but these components and their methods of attachment are known to those skilled in the art.

Conventionally attached to the other end of the crankshaft 12, in this case the second end 22, is a flywheel (not shown). The flywheel, which assists in reducing torsional fluctuations in the crankshaft 12, is in operative engagement with the drive shaft or transaxle of the vehicle.

Counterweights 26 and 26' are formed as integral components of the crankshaft 12. It is understood that the conventional modern internal combustion engine includes one or more such counterweights to provide balance to the crankshaft 12, the connecting rods, and their associated pistons.

To each side of the rod journal 18 is provided a spaced apart pair of crank webs 28 and 28'. Extending from the crank web 28 is a pair of ears 30 and 30". Extending from the crank web 28' is a pair of ears 32 and 32'.

To each side of the rod journal 18" is a spaced apart pair of crank webs 34 and 34'. Extending from the crank web 34 is a pair of ears of which one ear 36 is illustrated. Extending from the crank web 34' is a pair of ears 38 and 38'.

The disclosed inventive concept provides a cycloid insert formed from high grade hardened steel that is fitted into insert-receiving holes formed in the ears of the crankshaft which may be formed of conventional iron due to the provision of the hardened steel inserts.

FIG. 1 illustrates the crankshaft assembly 10 with the cycloid inserts. FIG. 2 illustrates the crankshaft assembly 10 with the cycloid inserts.

More particularly, the ear 30 includes a cycloid insert-receiving hole 40 and the ear 30' includes a cycloid insert-receiving hole 40'. The ear 32 includes a cycloid insert-receiving hole 42 and the ear 32' includes a cycloid insert-receiving hole 42'.

The ear 36 includes a cycloid insert-receiving hole 44 and the other ear formed on the web 34 includes a cycloid insert-receiving hole (not shown). The ear 38 includes a cycloid insert-receiving hole 46 and the ear 38' includes a cycloid insert-receiving hole (not shown).

Cycloid inserts are fitted into the insert-receiving holes formed in the ears. Specifically, a cycloid insert 48 is fitted into the cycloid insert-receiving hole 40 and a cycloid insert 48' is fitted into the cycloid insert-receiving hole 40'. A cycloid insert 50 is fitted into the cycloid insert-receiving hole 42 and a cycloid insert (not shown) is fitted into the cycloid insert-receiving hole 42'.

A cycloid insert 52 is fitted into the cycloid insert-receiving hole 44 and a cycloid insert (not shown) is fitted into the cycloid insert-receiving hole (not shown) formed in the other ear of the web 34. A cycloid insert 54 is fitted into the cycloid insert-receiving hole 46 and a cycloid insert 54' is fitted into the cycloid insert-receiving hole (not shown) formed in the ear 38'.

To prevent rotation of the cycloid inserts within their respective holes, anti-rotation pins are provided. A pin 56 is provided to interlock the cycloid insert 48 with respect to the ear 30 while a pin (not shown) is provided to interlock the cycloid insert 48' with respect to the ear 30'. A pin 58 is provided to interlock the cycloid insert 50 with respect to the ear 32 while a pin (not shown) is provided to interlock the cycloid insert (not shown) with respect to the ear 32'.

A pin 60 is provided to interlock the cycloid insert 52 with respect to the ear 36 while a pin (not shown) is provided to interlock the cycloid insert (not shown) with respect to the other ear formed on the web 34. A pin 62 is provided to interlock the cycloid insert 54 with respect to the ear 38 while a pin 62' is provided to interlock the cycloid insert 54' with respect to the ear 38'.

Each cycloid insert includes a cycloid path formed therein. Some of these are illustrated in FIG. 1 in which a cycloid path 64 is shown formed in the cycloid insert 48, a cycloid path 66 is formed in the cycloid insert 50, a cycloid path 68 is formed in the cycloid insert 52, a cycloid path 70 is formed in the cycloid insert 54, and a cycloid path 70' is formed in the cycloid insert 54'. Cycloid paths are also formed in the inserts not shown in FIG. 1 but understood to be provided as set forth above. FIG. 4 illustrates the cycloid insert 54 fitted into the cycloid insert-receiving hole 46 and the cycloid insert 54' fitted into the cycloid insert-receiving hole 46'. As also illustrated in FIG. 4, the pin 62 is fitted into the groove 72 (shown in FIG. 3) to interlock the cycloid insert 54 in relation to the ear 38 and the pin 62' is fitted into the groove 72' (also shown in FIG. 3) to interlock the cycloid insert 54' in relation to the ear 38'.

Figure 5:
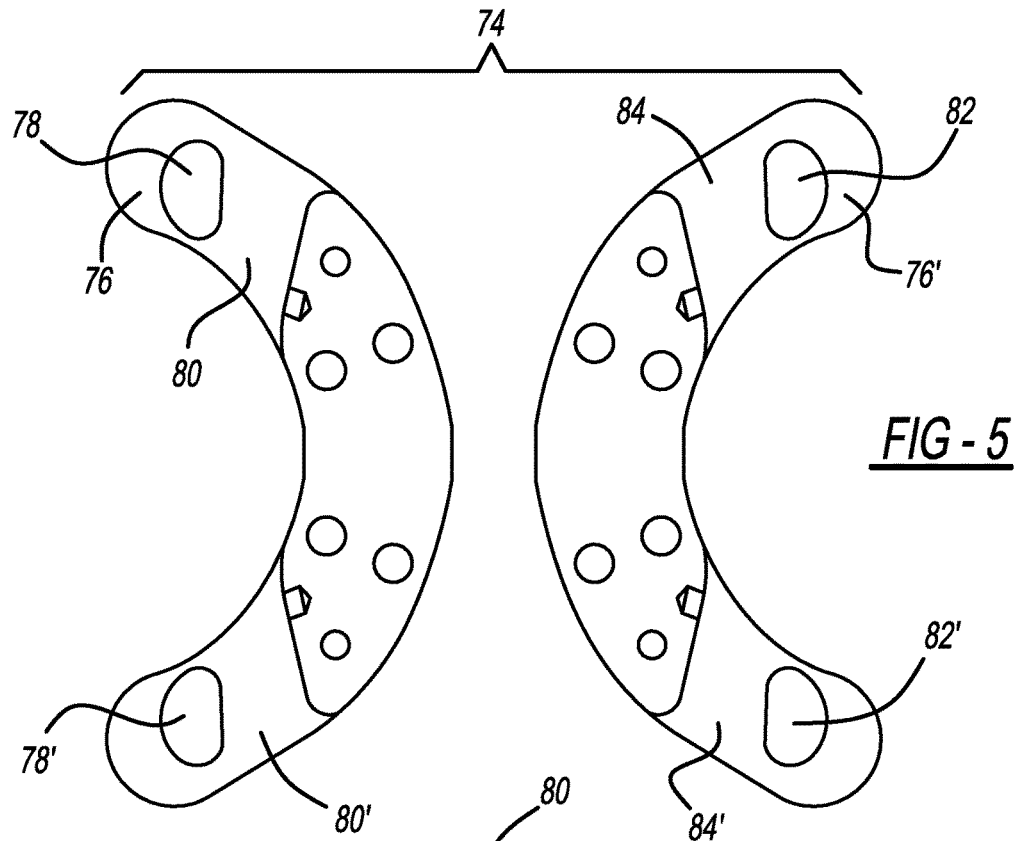
FIG. 5 shows the interior surfaces of each of the halves of the pendulum for use with the pendulum crankshaft of the disclosed inventive concept.
Figure 6:
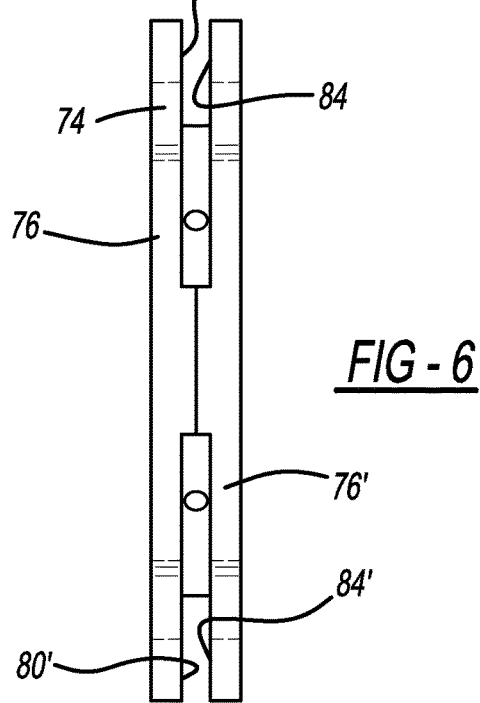
FIG. 6 is a side view of the halves shown in FIG. 5 assembled to form the pendulum.

Referring to FIGS. 5 and 6, an exemplary pendulum 74 for use with the disclosed inventive concept is illustrated. FIG. 5 shows the pendulum separated into two halves, a first pendulum half 76 and a pendulum second half 76'. FIG. 6 shows the two pendulum halves 76 and 76' assembled to form the pendulum 74.

As shown in FIG. 5, and referring to the first pendulum half 76, a cycloid path 78 is formed in a recessed surface 80 and a cycloid path 78' is formed in a recessed surface 80'. In the same manner and with respect to the second pendulum half 76' a cycloid path 82 is formed in a recessed surface 84 and a cycloid path 82' is formed in a recessed surface 84'.

Figure 7:
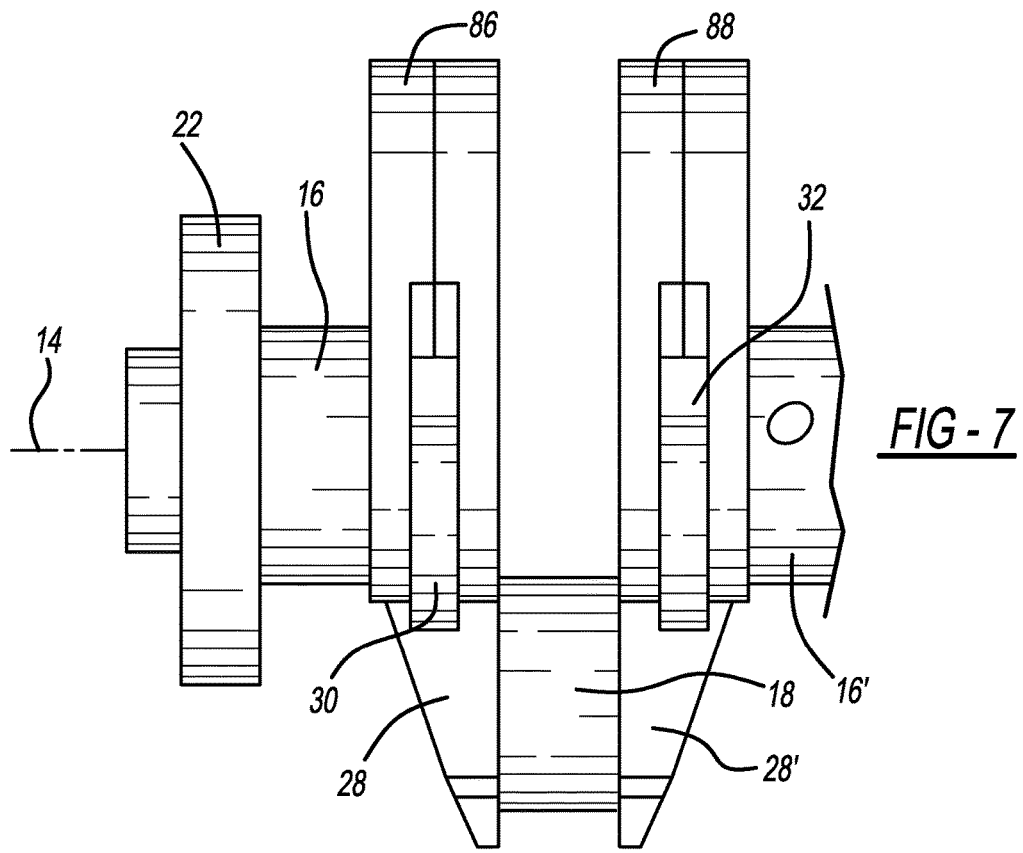
FIG. 7 is a close-up side view of pendulums fitted to the pendulum crankshaft of the disclosed inventive concept.

FIG. 7 illustrates a close-up side view of a pendulum 86 attached to the ear 30 and a pendulum 88 attached to the ear 32. It is to be understood that pendulums are attached to each of the ears of the crankshaft 12.

To allow for restricted movement of the pendulums of the disclosed inventive concept relative to their associated ears, rolling pins are provided that extend between the cycloid paths formed in opposing pendulum halves and through the cycloid paths formed in the cycloid inserts.

Figure 8:
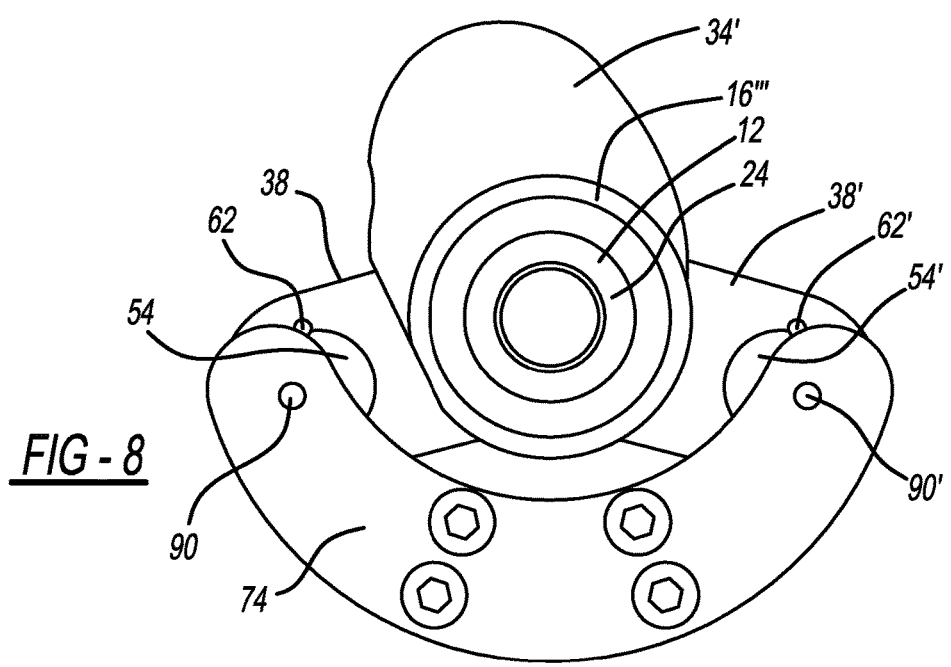
FIG. 8 is an end view of a pendulum attached to the pendulum crankshaft.
Figure 9:
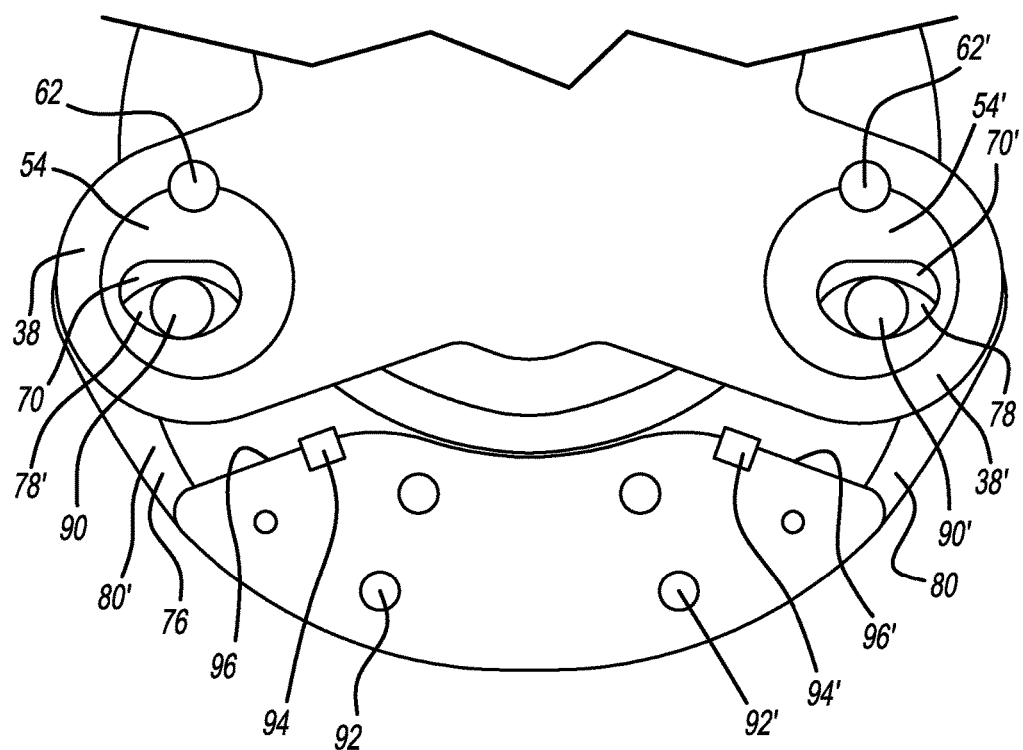
FIG. 9 is a diagrammatic end view of the pendulum and crankshaft assembly.

Particularly, and with respect to FIGS. 8 and 9, the pendulum 74 is shown attached to the ears 38 and 38'. FIG. 8 illustrates an end view of the pendulum 74 showing the second pendulum half 76' in place while FIG. 9 illustrates the same view as FIG. 8 but without the second pendulum half 76'.

As shown in FIG. 9, a rolling pin 90 is positioned through the cycloid path 70 formed in the cycloid insert 54 and into the cycloid path 78' formed in the recessed surface 80' of the first pendulum half 76. In the same manner a rolling pin 90' is positioned through the cycloid path 70' formed in the cycloid insert 54' and into the cycloid path 78 formed in the recessed surface 80 of the first pendulum half 76.

The first pendulum half 76 is attached to the second pendulum half 76' by mechanical fasteners such as bolts 92 and 92'. Other methods of fastening may be employed.

Side-to-side movement of the pendulum relative to the ears of the crankshaft is restricted to a predetermined degree of movement. To reduce metal-to-metal impact of the pendulum against the ears, bumpers 94 and 94' are provided in stops 96 and 96' formed on opposing surfaces of the ears 38 and 38'.

The pendulum stops 96 and 96' may be adjusted to allow for different angles of swing. For example, and preferably, the pendulum stops 96 and 96' allow +/−49.4° of travel. If the swing angle is larger the system must be detuned.

As noted above, or purposes of beta testing it may be necessary to temporarily fix the pendulum relative to the crankshaft. Such testing would ordinarily be performed on a pre-production or a non-production engine. Accordingly, an alternate embodiment of the pendulum crankshaft of the disclosed inventive concept is provided and is illustrated in FIGS. 10 through 13.

Figure 10:
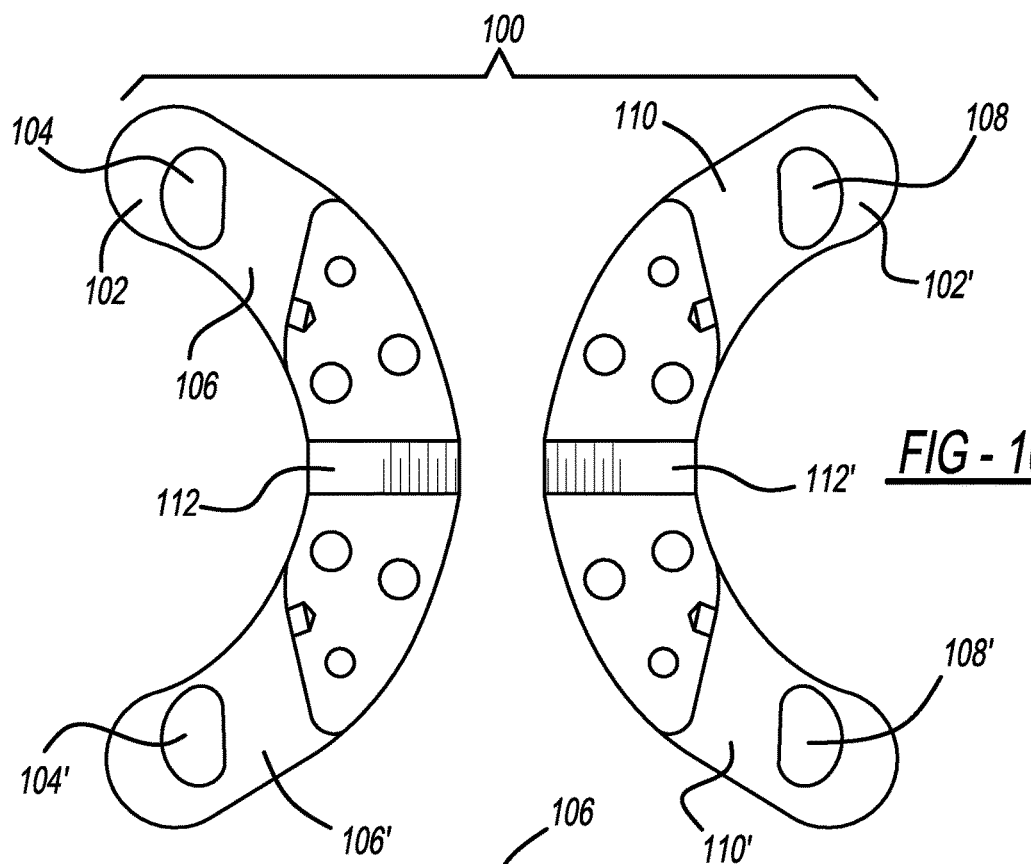
FIG. 10 is a view similar to that shown in FIG. 5 but illustrating the two halves of the pendulum according to an alternative embodiment of the disclosed inventive concept having a locking mechanism that includes a locking pin.
Figure 11:
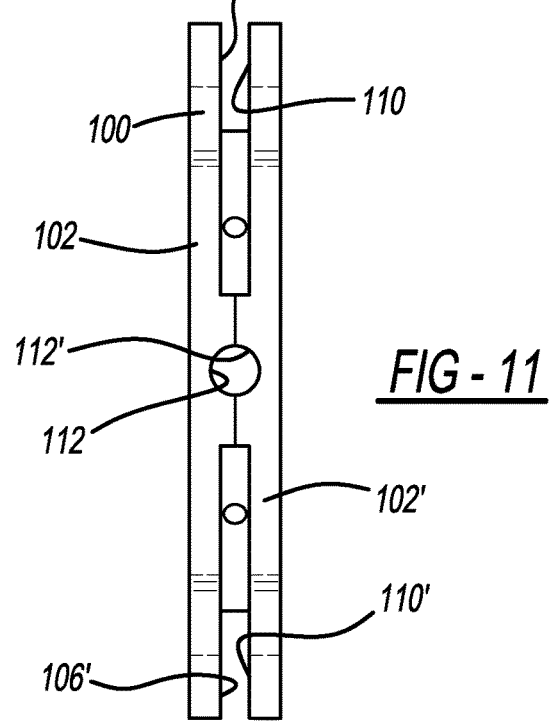
FIG. 11 is a view similar to that shown in FIG. 6 but illustrating a locking pin aperture formed through the assembled pendulum formed from the two halves illustrated in FIG. 10.

Referring to FIGS. 10 and 11, a pendulum 100 for use with the locking version of the disclosed inventive concept is illustrated. FIG. 10 shows the pendulum separated into two halves, a first pendulum half 102 and a pendulum second half 102'. FIG. 11 shows the two pendulum halves 102 and 102' assembled to form the pendulum 100.

As shown in FIG. 10, and referring to the first pendulum half 102, a cycloid path 104 is formed in a recessed surface 106 and a cycloid path 104' is formed in a recessed surface 106'. In the same manner and with respect to the second pendulum half 102' a cycloid path 108 is formed in a recessed surface 110 and a cycloid path 108' is formed in a recessed surface 110'.

Also formed in the first pendulum half 102 is a balance pin groove 112 while formed in the second pendulum half 102' is a balance pin groove 112'.

Figure 12:
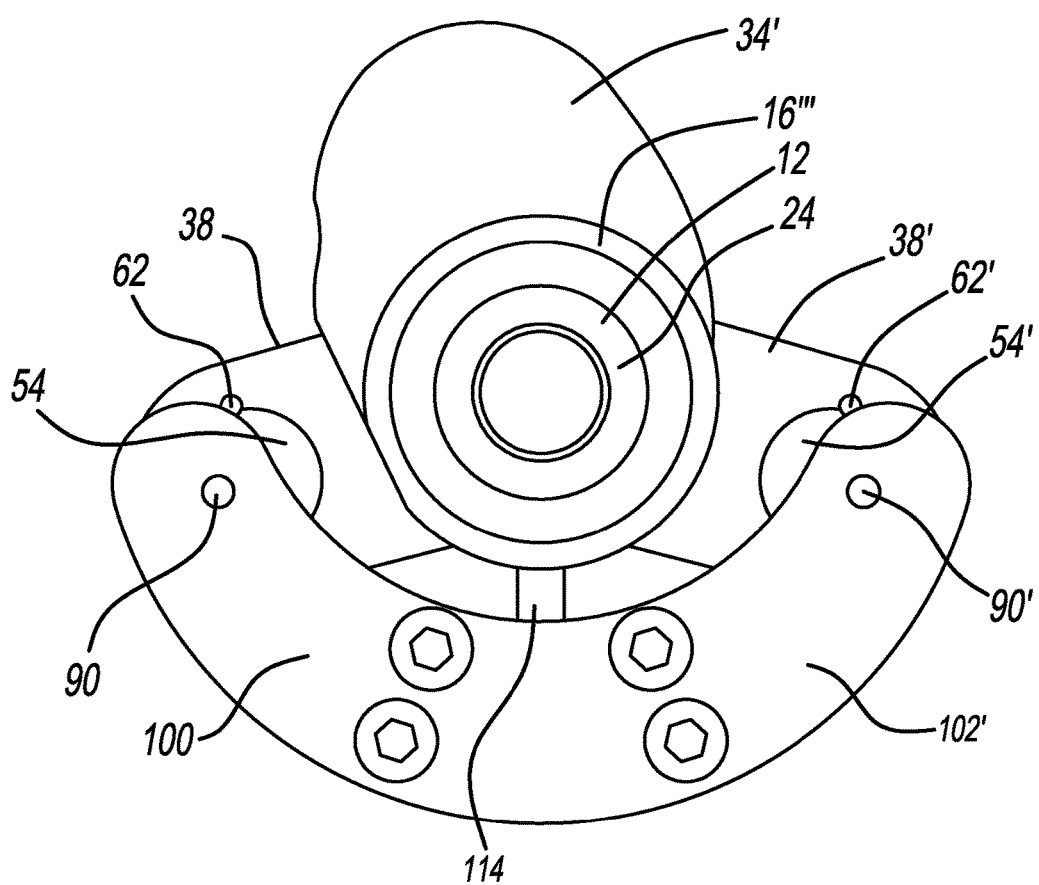
FIG. 12 is a view similar to that shown in FIG. 8 but illustrating the pendulum shown in its locked position relative to the crankshaft according to an alternate embodiment of the disclosed inventive concept.
Figure 13:
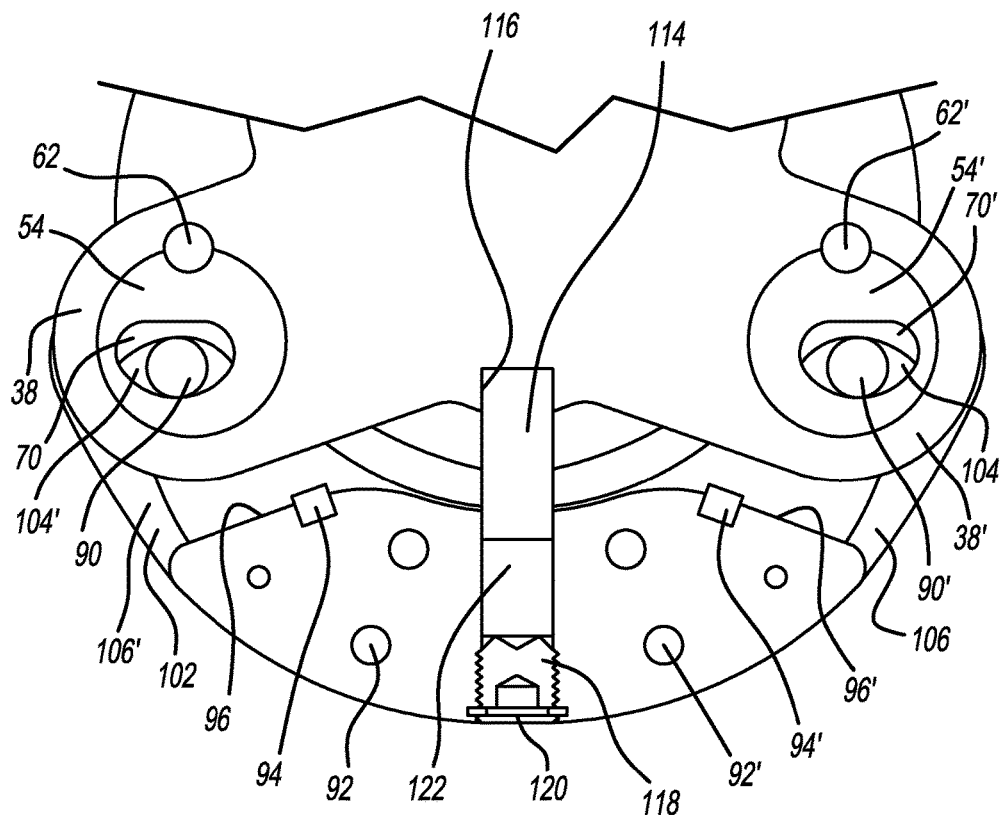
FIG. 13 is a view similar to that shown in FIG. 9 but illustrating a diagrammatic end view of the pendulum and crankshaft assembly with the pendulum shown in its unlocked position relative to the crankshaft.

FIGS. 12 and 13 illustrate the attachment of the pendulum 100 to the ears 38 and 38'. FIG. 12 illustrates an end view of the pendulum 100 showing the second pendulum half 102' in place over the first pendulum half 102 while FIG. 13 illustrates the same view as FIG. 12 but without the second pendulum half 102' in place over the first pendulum half 102.

A rolling pin 90 is positioned through the cycloid path 70 formed in the cycloid insert 54 and into the cycloid path 104' formed in the recessed surface 106' of the first pendulum half 102. In the same manner a rolling pin 90' is positioned through the cycloid path 70' formed in the cycloid insert 54' and into the cycloid path 104 formed in the recessed surface 106 of the first pendulum half 102.

A removable locking pin 114 is provided to lock the pendulum 100 with respect to the crankshaft 12 for base line testing as set forth above. The locking pin 114 is removably provided through the balance pin groove 112 formed in the first pendulum half 102 and the balance pin groove 112' formed in the second pendulum half 102'. In FIGS. 12 and 13, the locking pin 114 is shown in its locked position extending from the pendulum 100 into a locking pin receiving aperture 116 formed in the crankshaft 12.

When the locking pin 114 is in use a threaded plug 118 is provided to hold it in place. A snap ring 120 is fitted to hold the set screw 118 in place. Between the locking pin 114 and the set screw 118 is a nylon spacer 122.

When not being tested, the threaded plug 118, the nylon spacer 122 and the locking pin 114 are all removed. In such a case a solid balance pin (not shown) having a threaded upper portion is used. The snap ring 120 is fitted with the balance pin to prevent the balance pin from backing out.

The disclosed inventive concept as set forth above overcomes the challenges faced by known pendulum crankshaft arrangements for internal combustion engines by providing pendulum crank cycloid inserts for a pendulum crankshaft having an integral carrier. For example, the pendulum crankshaft of the disclosed inventive concept allows the lugging limit of an engine to be reduced to a relatively low RPM rate. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A pendulum crankshaft for an internal combustion engine, comprising:
   a crankshaft;
   a first pendulum-holding ear formed on said crankshaft;
   a first steel cycloid insert fitted to said first pendulum holding ear, said first cycloid insert having a first cycloid path formed therethrough;
   a first interlock pin to secure said first cycloid insert into said first pendulum holding ear;
   a second pendulum-holding ear formed next to and spaced apart from said first pendulum-holding ear on said crankshaft;
   a second steel cycloid insert fitted to said second pendulum-holding ear, said second cycloid insert having a second cycloid path formed therethrough;
   a second interlock pin to secure said second cycloid insert into said second pendulum-holding ear;
   a pendulum movably attached to said first and second pendulum-holding ears, said pendulum including recessed areas, a pair of stops formed as interior surfaces opposite said ears, and a respective bumper provided in each of said stops and partially extending into a respective one of said recessed areas; and
   a first rolling pin fitted through said first cycloid path for attachment of said pendulum to said first pendulum-holding ear and a second rolling pin fitted through said second cycloid path for attachment of said pendulum to said second pendulum-holding ear.

2. The pendulum crankshaft for an internal combustion engine of claim 1 wherein said pendulum has cycloid paths formed in said recessed areas.

3. A pendulum crankshaft for an internal combustion engine, comprising:
   a crankshaft;
   a first pendulum-holding ear and a second pendulum-holding ear, both of said pendulum-holding ears being formed on said crankshaft;
   a first cycloid insert fitted to said first pendulum-holding ear, said first cycloid insert having a first cycloid path formed therethrough and a second cycloid insert fitted to said second pendulum holding ear, said second cycloid insert having a second cycloid path formed therethrough;
   a first interlock pin to secure said first cycloid insert into said first pendulum-holding ear and a second interlock pin to secure said second cycloid insert into said second pendulum-holding ear;
   a pendulum movably attached to said ears, said pendulum including recessed areas, a pair of stops formed as interior surfaces opposite said ears, and a respective bumper provided in each of said stops and partially extending into a respective one of said recessed areas; and
   a first rolling pin fitted through said first cycloid path for attachment of said pendulum to said first pendulum-holding ear and a second rolling pin fitted through said second cycloid path for attachment of said pendulum to said second pendulum-holding ear.

4. The pendulum crankshaft for an internal combustion engine of claim 3 wherein said pendulum includes a first half and a second half.

5. The pendulum crankshaft for an internal combustion engine of claim 4 wherein each of said halves has cycloid paths formed therein.

6. The pendulum crankshaft for an internal combustion engine of claim 4 wherein said pendulum has cycloid paths formed in said recessed areas.

7. The pendulum crankshaft for an internal combustion engine of claim 3 wherein said pendulum includes a pendulum interlock pin passing aperture formed therein and said crankshaft includes a pendulum locking pin receiving aperture formed therein.

* * * * *